(12) United States Patent  (10) Patent No.: US 8,160,290 B2
Jørgensen et al.  (45) Date of Patent: Apr. 17, 2012

(54) ELECTROACOUSTIC TRANSDUCER HAVING A SLOTTED TERMINAL STRUCTURE FOR CONNECTION TO A FLEXIBLE WIRE, AND AN ASSEMBLY OF THE SAME

(75) Inventors: Martin Bondo Jørgensen, Vaerløse (DK); Karsten Videbæk, Kirke-Hyllinge (DK)

(73) Assignee: Sonion A/S, Roskilde (DK)

( * ) Notice: Subject to any disclaimer, the term of this patent is extended or adjusted under 35 U.S.C. 154(b) by 844 days.

(21) Appl. No.: 12/231,346

(22) Filed: Sep. 2, 2008

(65) Prior Publication Data

US 2009/0059725 A1   Mar. 5, 2009

Related U.S. Application Data

(60) Provisional application No. 60/967,363, filed on Sep. 4, 2007.

(51) Int. Cl.
*H04R 25/00* (2006.01)
(52) U.S. Cl. ......... 381/394; 381/324; 381/322; 381/328
(58) Field of Classification Search .................. 381/394, 381/324, 322, 328, 409–410, 417, 418
See application file for complete search history.

(56) References Cited

U.S. PATENT DOCUMENTS

| 1,667,598 | A | | 4/1928 | Lenz | |
|---|---|---|---|---|---|
| 2,229,377 | A | | 1/1941 | Friang | 173/332 |
| 2,272,432 | A | * | 2/1942 | Rogie | 439/680 |
| 2,755,452 | A | | 7/1956 | Rogie | 339/196 |
| 2,939,905 | A | * | 6/1960 | Canfield | 174/71 R |

FOREIGN PATENT DOCUMENTS

| EP | 1684544 A2 | 7/2006 |
|---|---|---|
| WO | WO 2005/115053 A1 | 12/2005 |

OTHER PUBLICATIONS

European Search Report for European Patent Application No. 08163569.0-2225, dated Nov. 3, 2008, 6 pages.

* cited by examiner

*Primary Examiner* — Davetta W Goins
*Assistant Examiner* — Jasmine Pritchard
(74) *Attorney, Agent, or Firm* — Nixon Peabody LLP

(57) ABSTRACT

The assembly includes a miniature electroacoustic transducer and a flexible electrical wire. The flexible electrical wire is terminated by a connecting element with an electrically conductive shoulder portion. The miniature electroacoustic transducer comprises an electrically conducting, externally accessible terminal having a slot structure formed therein. The slot structure is configured to mechanically and electrically engage the electrically conductive shoulder portion of the connecting element.

13 Claims, 2 Drawing Sheets

ELECTROACOUSTIC TRANSDUCER HAVING A SLOTTED TERMINAL STRUCTURE FOR CONNECTION TO A FLEXIBLE WIRE, AND AN ASSEMBLY OF THE SAME

RELATED APPLICATIONS

The present application claims priority to U.S. Provisional Application No. 60/967,363, filed Sep. 4, 2007, which is herein incorporated by reference in its entirety.

FIELD OF THE INVENTION

The present invention relates to an improvement in the providing of electrical connections to miniature electroacoustic transducers, such as transducers for mobile terminals, head-sets, hearing aids and in-ear-monitors.

BACKGROUND OF THE INVENTION

In general, a problem exists when providing electrical connection to miniature electroacoustic transducers in that the structural dimensions are very small, especially in the electrical terminals. Accordingly, the heat capacity is very small, which may easily lead to overheating and destruction of the transducer during normal soldering operations of the electrical wires.

Connections of miniature electroacoustic transducers may, for example, be seen in EP-A-1684544, where flexible elements are used for providing a solderless connection to a hearing aid transducer.

SUMMARY OF THE INVENTION

In a first aspect, the invention relates to an assembly of a miniature electroacoustic transducer and a flexible electrical wire. The flexible electrical wire is terminated by a connecting element with an electrically conductive shoulder portion. The miniature electroacoustic transducer comprises an electrically conducting, externally accessible terminal having a slot structure formed therein. The slot structure is configured to mechanically and electrically engage the electrically conductive shoulder portion of the connecting element.

In the present context, a flexible wire is a wire that may be bent or deformed by finger force, such as the well-known litze wires customarily applied for electrical interconnections in hearing instruments. Such flexible wires are preferred in hearing aid designs in order to prevent the transport of vibration from a receiver generating sound to a microphone picking up sound.

In this context, it is noted that the wire may comprise a separate element, or have been connected to an element forming the shoulder portion, such as a drop of solder or the preferred element described further below. Alternatively, the connecting element may be provided by altering the shape of the wire by, for example, machining the wire to obtain the shoulder portion without adding additional material or elements.

In other words, the wire is terminated by the element means, in the present context, and the shoulder portion is provided at an end portion of the wire.

In the present context, a miniature electroacoustic transducer is a transducer occupying a volume of less than 1200 $mm^3$. For different types of applications (such as hearing aid applications, in-ear monitors, and the like), smaller transducers occupying less than 100 $mm^3$ are highly desirable. And, for headsets and other types of portable communication devices, any intermediate volume may be usable depending on the requirements to the transducer.

In the present context, a slot portion is a portion which has an opening adapted to engage the shoulder portion so as to provide electrical and physical contact. In a preferred embodiment, the slot structure comprises a first element and a second element. The first element comprising two parts, each adapted to engage the shoulder portion at a predetermined position. The second element mechanically biases or forces the shoulder portion toward the first element. Then, the first element and/or the second element suitably could be electrically conductive to facilitate the electrical connection to the shoulder portion. In addition, the second element preferably is adapted to engage the end of the electrical conductor and/or the connecting element.

It is desired that the two parts of the first element extend at least generally in a plane of a wall portion of the transducer to which the slot structure is fixed. This has the advantage that the direction of introduction of the connecting element may be different from a direction of pull, when pulling the wire away from the miniature electroacoustic transducer.

In order to make introduction of the shoulder portion into the slot structure as easy as possible, it is desired that the shoulder portion is rotationally symmetric. Thus, its rotational orientation is unimportant during introduction into the slot structure.

In one embodiment, the shoulder portion is defined by a first portion and a second portion. The first portion has a first width along a predetermined direction, which preferably is perpendicular to a general direction of the wire. The second portion has a second width along the direction. The first portion is positioned closer than the second portion to the first end of the conductor. The first width is larger than the second width.

In the preferred embodiment, each of the two parts of the first element may form finger or leg structures of a U-shaped element, a distance between the leg-structures being between the first and second widths. Thus, the first portion is engaged and fixed when introduced between the two parts of the first element.

In one embodiment, the shoulder portion has a part which, in a predetermined plane, is at least substantially circular and has a smaller area than an adjacent part of the shoulder portion. The slot structure comprises a protrusion adapted to provide a retention force at removal of the part of the shoulder portion from the slot structure. In the preferred embodiment, the protrusion could be a part of one (or both) of the two parts of the first element.

Preferably, the protrusion is provided at a part on one side of a slot of the slot structure and has a direction generally toward an opposite side of the slot. The protrusion is positioned at a distance, exceeding a diameter of the circular portion, from a bottom of the slot. In the preferred embodiment, the protrusion is then positioned at one of the two parts of the first element and is directed toward the other of the two parts.

Then, a distance from a tip of the protrusion to the opposite part is preferably smaller than the diameter of the circular portion. As such, the protrusion will prevent or make difficult the removal of the circular portion from the slot structure past the projection.

Alternatively to the above position of the protrusion, the slot structure could have a protrusion or element directed from the first element toward the second element or from the second element to the first element. A distance at the protrusion or element between the first and second elements is smaller than a thickness of the adjacent part of the shoulder portion. In that situation, the protrusion will not be directed toward the path of the "neck portion" adjacent to the shoulder portion, but will be directed toward the path of the shoulder portion and thereby again prevent or make difficult removal of the shoulder portion from the slot structure.

In another preferred embodiment, the slot structure is elastically deformable in a direction toward and away from a wall portion of the transducer to which the slot structure is fixed. In the first preferred embodiment, this could mean that the two parts are deformable so as to allow introduction and removal of the connecting element.

Deformability toward the miniature electroacoustic transducer may alternatively be utilized when connecting the transducer in another manner, i.e. by simply forcing or biasing the slot structure toward an electrically conducting area, such as a solder pad, instead of using the wire with the shoulder portion. This embodiment is especially interesting when the transducer is vibration cancelled, as is disclosed in PCT Publication WO2005/115053.

A second aspect of the invention relates to a miniature electroacoustic transducer, such as a moving-armature receiver, condenser or electret microphone, for use in the assembly according to the first aspect of the invention.

A third and final aspect of the invention relates to a slot structure for use in the assembly of the first aspect. This slot structure may be manufactured from a pre-shaped material, for example by punching, cutting or etching a piece of metal in a thickness of 75-200 μm and bending it into the desired shape for example as shown in FIG. 1. Preferred materials comprise solderable or weldable electrically conductive metallic or alloy materials such as silver, brass, copper, stainless steel or precious metal. The slot structure may advantageously comprise a surface coating of a conductive material such gold or silver. The slot air gap height is preferably selected in the range between 100 and 500 μm, more preferably between 150 and 300 μm. The outer dimensions of a two terminal slot structure are preferably less than (L*W*H) 3 mm*1.5 mm*1.0 mm to flexibly fit within the rear surface of existing miniature electroacoustic transducers.

Naturally, the shoulder portion of the connection element is fabricated with dimensions that fit to the corresponding dimensions of the slot structure. The thickness of the shoulder portion may, therefore, have slightly larger size than the slot air gap height for example between 150 and 550 μm, more preferably between 200 and 350 μm.

BRIEF DESCRIPTION OF THE DRAWINGS

In the following, a preferred embodiment of the invention will be described with reference to the drawings, wherein.

Figure 1:
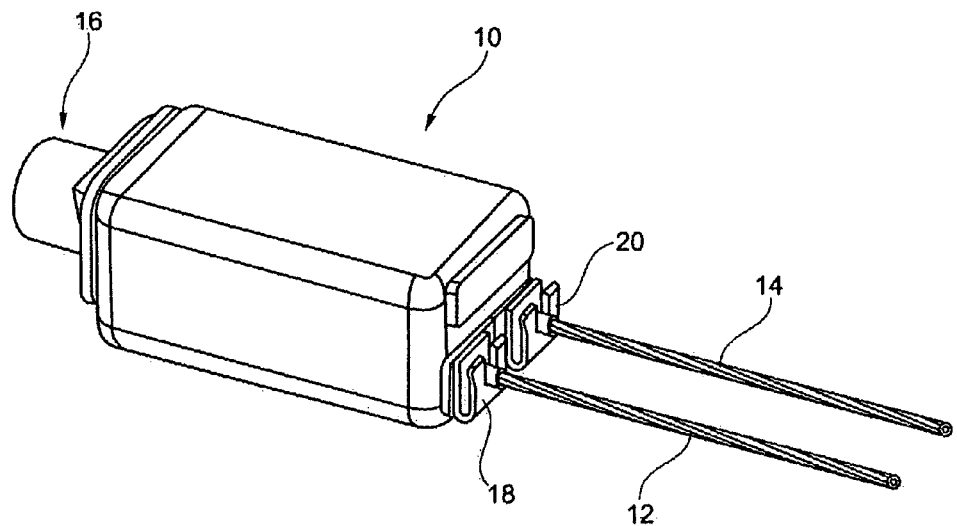
FIG. 1 illustrates a receiver connected to two wires.

While the invention is susceptible to various modifications and alternative forms, specific embodiments thereof have been shown by way of example in the drawings and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DETAILED DESCRIPTION OF THE DRAWINGS

FIG. 1 illustrates a miniature electroacoustic transducer 10 in the form of a moving armature receiver with dimensions suitable for use in hearing instruments, head-sets and in-ear-monitors. The moving armature receiver 10 is connected to a pair of flexible wires 12 and 14 and comprises a spout or sound port 16 for outputting sound. The two wires 12 and 14 are connected, respectively, to a connecting means 18 and 20 of an electrical terminal, which is illustrated in close-up in FIG. 3. The connecting means 18 and 20 of the terminal are identical, so only the connector 18 will be described in detail.

Figure 2:
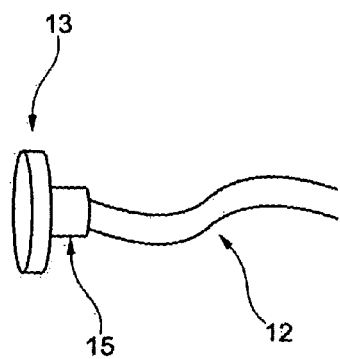
FIG. 2 illustrates a wire with a shoulder portion.

In the present embodiment, as shown in FIG. 2, a termination element for the wire 12 comprises a cylindrical shoulder element 13 which has a cylindrical (with a lower diameter) neck portion 15 and is connected to the wire 12. Alternatively, the neck portion 15 could simply be absent, such that the termination element is formed by the wire itself.

Figure 3:
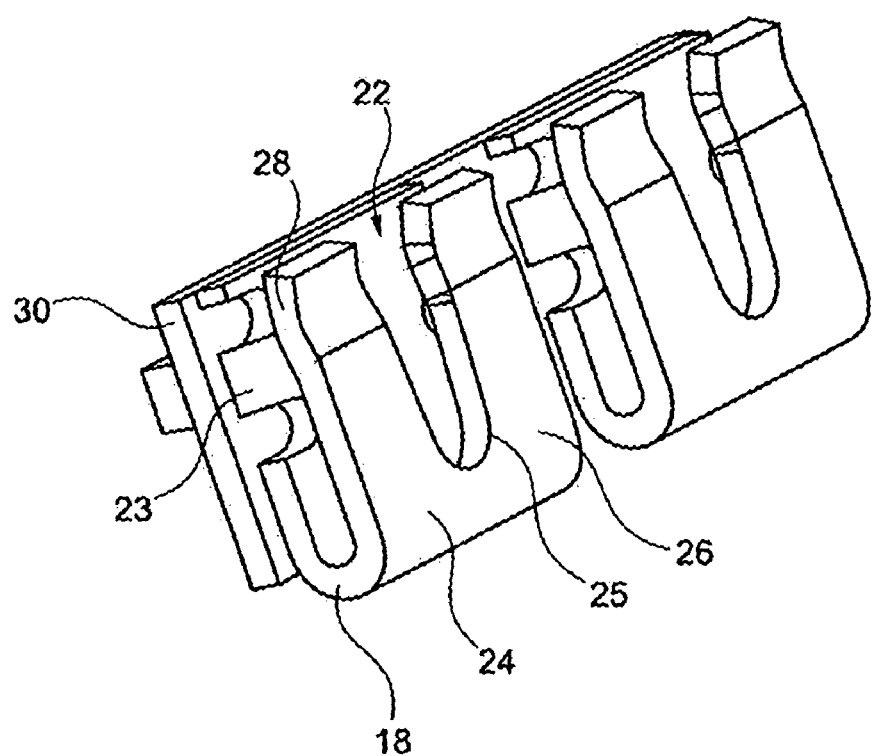
FIG. 3 illustrates a close-up of the connecting means of FIG. 1.

In FIG. 3, it is seen that the connecting means 18 is formed by a piece of bent material, such as metal, and has a back surface 23. A U-shaped portion 22 comprises two leg or finger structures 24 and 26 defining there-between a slot or space for receiving the neck portion 15 of the wire 12. This space or slot has a bottom 25. The slot structure is preferably pre-welded to a carrier PCB 30 as illustrated, which provides electrical connectivity between internal electrical contacts placed inside the miniature electroacoustic transducer housing (such as electrical drive coil leads or electret element contacts) and the slot structure before final assembly of the transducer 10. The shoulder portion 13 of the wire 12 is fit between the back portion 23 and the leg or finger structures 24/26.

In addition, the leg structures 24/26 comprise projections or bends 28 directed toward the back portion 23. The distance between the tips of the bends 28 and the back portion 23 is smaller than a thickness of the thick part of the shoulder element 13. Also, the bends 28 are positioned from the bottom 25 by a distance larger than the diameter of the neck portion 15, added the difference in radius of the shoulder portion 13 and the neck portion 15, so as to ensure that the shoulder portion 13 is received on the bottom-side of the bends 28, when the neck portion 15 engages the bottom 25. Thus, the bends 28 prevent or make difficult the removal of the wire 12 when attached to the element 18.

Alternatively, a projection or bend could be provided on one leg structure 24 (or both), having a direction toward the leg structure 26. In the alternative, the distance between a tip of this projection and the leg structure 26 would then be smaller than the diameter of the neck portion 15, so as to again prevent or make difficult the removal of the wire 12 from the element 18.

For very compact transducers 10 for use, for example, in hearing aids, the elements 18 may have very small dimensions, such as a thickness of the bent metal of 75-200 μm, a distance between the back portion 23 and the leg structures 24/26 may be between 100 and 500 μm, more preferably between 150 and 300 μm. In addition, the outer dimensions of a two-terminal slot structure are preferably less than (L*W*H) 3 mm*1.5 mm*1.0 mm.

An advantage of the present embodiment is seen in that the leg structures 24/26 are displaceable both toward and away from the miniature electroacoustic transducer 10. This resiliency/deformability or spring loading is used for allowing the shoulder portion 15 to pass the bends 28 while subsequently making it difficult for the shoulder portion 15 to be removed from the element 18. The direction of introduction and removal of the shoulder element 13 is different from a direction of pull of the wire 12, which prevents accidental removal of the shoulder element 13 from the connecting means 18.

In addition, this resiliency may be utilized in another embodiment where the connecting means 18/20 are not connected to wires 12/14 as illustrated in FIG. 1, but are forced or biased against electrical conducting surfaces, so that this resiliency guarantees good electrical contact. This embodiment may be one in which the transducer 10 is positioned inside a housing or otherwise in relation to the conducting surfaces, which may be solder bumps or solder pads or the like, so as to provide the biasing.

While particular embodiments and applications of the present invention have been illustrated and described, it is to be understood that the invention is not limited to the precise construction and compositions disclosed herein and that various modifications, changes, and variations may be apparent from the foregoing descriptions without departing from the spirit and scope of the invention as defined in the appended claims.

The invention claimed is:

1. An assembly comprising a miniature electroacoustic transducer and a flexible electrical wire, wherein:
the flexible electrical wire is terminated by an electrically conductive connecting element including: a shoulder having a first width dimension extending in a plane oriented substantially perpendicular to the orientation of an end of the flexible electrical wire proximate to the connecting element; and
the miniature electroacoustic transducer comprises an electrically conducting, externally accessible terminal configured to mechanically and electrically engage the connecting element, the externally accessible terminal comprising:
a back fixed to the miniature electroacoustic transducer; and
a first leg and a second leg each biased toward the back, the first and second legs defining a slot structure of the externally accessible terminal,
wherein each of the first and second legs are adapted to engage the shoulder of the connecting element while the flexible wire is oriented substantially perpendicular to the back,
and wherein the first and second legs extend at least generally in a plane of the wall of the miniature electroacoustic transducer such that the connecting element is received into the slot structure of the terminal from a direction substantially perpendicular to the orientation of the end of the flexible electrical wire proximate to the connecting element.

2. The assembly according to claim 1, wherein the externally accessible terminal is configured to only allow the connecting element to be inserted from a direction substantially perpendicular to the orientation of the end of the flexible electrical wire proximate to the connecting element.

3. The assembly according to claim 1, wherein the connecting element further includes a neck having a second width extending in the same plane as the width of the shoulder, the second width being less than the first width, the neck being positioned closer to the end of the flexible electrical wire than the shoulder, and wherein the neck is adapted to engage an inner surface of the slot structure while the connecting element is inserted in the externally accessible terminal.

4. The assembly according to claim 1, wherein the first and second legs are biased toward the back such that at least a portion of the first and second legs are separated from the back by a distance less than a depth dimension of the shoulder of the connecting element.

5. The assembly according to claim 3,
wherein the first and second legs form a U-shaped structure, a distance between the first and second legs being between the first and second widths.

6. The assembly according to claim 3, wherein the shoulder has a part which, in a predetermined plane, is at least substantially circular and has a smaller area than an adjacent part of the neck, and wherein the slot structure comprises a protrusion adapted to provide a retention force against removal of the connecting element from the slot structure.

7. The assembly according to claim 6, wherein the protrusion is provided at a part on one of the first or second legs of the slot structure, which the protrusion has a direction generally toward an opposite one of the first and second legs of the slot structure, the protrusion being positioned at a distance from a bottom of an interior of the slot structure which exceeds, a diameter of the shoulder.

8. The assembly according to claim 7, wherein a distance from a tip of the protrusion to the opposite leg is smaller than the diameter of the shoulder.

9. The assembly according to claim 3, wherein the slot structure comprises
a protrusion directed from the first leg toward the second leg or from the second leg to the first leg, a distance between a tip of the protrusion and the first or second leg being smaller than a width of an adjacent portion of the connecting element such that the protrusion prevents removal of the connecting element from the slot structure.

10. The assembly according to claim 1, wherein the slot structure is elastically deformable in a direction toward and away from the wall of the transducer to which the slot structure is fixed to allow the connecting element to be removed from a direction substantially within a plane of the wall of the transducer while resisting accidental removal due to a pulling force applied to the flexible electrical wire along a direction different from the direction of removal.

11. A miniature electroacoustic transducer for use in an assembly comprising the miniature electroacoustic transducer and a flexible electrical wire, wherein:
the flexible electrical wire is terminated by an electrically conductive connecting element including: a shoulder having a first width dimension extending in a plane oriented substantially perpendicular to the orientation of an end of the flexible electrical wire proximate to the connecting element; and
the miniature electroacoustic transducer comprises an electrically conducting, externally accessible terminal configured to mechanically and electrically engage the connecting element, the externally accessible terminal comprising:
a back fixed to the miniature electroacoustic transducer; and
a first leg and a second leg each biased toward the back, the first and second legs defining a slot structure of the externally accessible terminal,
wherein each of the first and second legs are adapted to engage the shoulder of the connecting element while the flexible wire is oriented substantially perpendicular to the back,
and wherein the first and second legs extend at least generally in a plane of the wall of the miniature electroacoustic transducer such that the connecting element is received into the slot structure of the terminal from a direction substantially perpendicular to the orientation of the end of the flexible electrical wire proximate to the connecting element.

12. A slot structure for use in an assembly comprising a miniature electroacoustic transducer and a flexible electrical wire, wherein:
  the flexible electrical wire is terminated by an electrically conductive connecting element including: a shoulder having a first width dimension extending in a plane oriented substantially perpendicular to the orientation of an end of the flexible electrical wire proximate to the connecting element; and
  the miniature electroacoustic transducer comprises an electrically conducting, externally accessible terminal configured to mechanically and electrically engage the connecting element, the externally accessible terminal comprising:
    a back fixed to the miniature electroacoustic transducer; and
    a first leg and a second leg each biased toward the back, the first and second legs defining the slot structure of the externally accessible terminal,
    wherein each of the first and second legs are adapted to engage the shoulder of the connecting element while the flexible wire is oriented substantially perpendicular to the back,
    and wherein the first and second legs extend at least generally in a plane of the wall of the miniature electroacoustic transducer such that the connecting element is received into the slot structure of the terminal from a direction substantially perpendicular to the orientation of the end of the flexible electrical wire proximate to the connecting element.

13. A miniature electroacoustic transducer, comprising:
  a housing;
  transducer elements within the housing;
  an electrically conducting terminal externally accessible on the housing and electrically coupled to at least one of the transducer elements, the terminal having a slot structure formed therein, the slot structure being configured to mechanically and electrically engage an electrically conductive shoulder of a connecting element terminating an end of a flexible electrical wire, the shoulder having a first width dimension extending in a plane oriented substantially perpendicular to the orientation of an end of the flexible electrical wire proximate to the connecting element,
  the slot structure comprising:
    a first leg and a second leg each biased toward a back of the terminal, the first and second legs defining the slot structure of the externally accessible terminal
    wherein each of the first and second legs are adapted to engage the shoulder of the connecting element while the flexible wire is oriented substantially perpendicular to the back,
    and wherein the first and second legs extend at least generally in a plane such that the connecting element is received into the slot structure of the terminal from a direction substantially perpendicular to the orientation of the end of the flexible electrical wire proximate to the connecting element.

* * * * *